(12) United States Patent
Peter et al.

(10) Patent No.: US 6,917,462 B2
(45) Date of Patent: Jul. 12, 2005

(54) METHOD AND APPARATUS FOR TRANSLATING A SPATIAL LIGHT MODULATOR TO PROVIDE DITHERING

(75) Inventors: Timothy A. Peter, Hilton, NY (US); Richard A. Colleluori, Rochester, NY (US); Michael J. O'Brien, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 125 days.

(21) Appl. No.: 10/373,255

(22) Filed: Feb. 24, 2003

(65) Prior Publication Data

US 2004/0165162 A1 Aug. 26, 2004

(51) Int. Cl.[7] .............................................. G02B 26/00
(52) U.S. Cl. ....................................... 359/291; 359/290
(58) Field of Search ................................ 359/822, 813, 359/814, 290, 291, 245

(56) References Cited

U.S. PATENT DOCUMENTS

| | | | |
|---|---|---|---|
| 4,810,058 A | 3/1989 | Sangyoji et al. ............... | 349/2 |
| 5,461,410 A | 10/1995 | Venkateswar et al. ...... | 347/240 |
| 5,461,411 A | 10/1995 | Florence et al. .............. | 347/20 |
| 5,626,411 A | 5/1997 | Takahashi et al. ............ | 353/94 |
| 5,715,029 A | 2/1998 | Fergason ..................... | 349/196 |
| 5,727,860 A | 3/1998 | Broer et al. ................... | 353/20 |
| 5,745,281 A * | 4/1998 | Yi et al. ....................... | 359/290 |
| 6,130,740 A | 10/2000 | DeClerck et al. ............. | 355/18 |
| 6,288,824 B1 * | 9/2001 | Kastalsky .................... | 359/254 |

FOREIGN PATENT DOCUMENTS

| | | |
|---|---|---|
| JP | 2-536859 B2 | 7/1996 |
| JP | 2-801088 B2 | 7/1998 |

* cited by examiner

*Primary Examiner*—Georgia Epps
*Assistant Examiner*—M. Hasan
(74) *Attorney, Agent, or Firm*—Nelson Adrian Blish

(57) ABSTRACT

A method for translating a spatial light modulator (22) to provide dithering comprises the steps of: providing a support (11) have a high degree of flexibility; rigidly attaching an outer portion (14) of the support to a nonmoving base; attaching an inner web (12) of the support to the outer portion by means of flexible members (16); wherein the support, the outer portion, the inner web, and the flexible members are located in a first plane; wherein the flexible members allows motion of the inner web in only one dimension of the first plane; attaching a piezoelectric device (18) to a first end of the inner web; energizing the piezoelectric device to move the inner web in a positive direction in the one dimension; attaching a spring (20) to a second end of the inner web; and wherein the spring moves the inner web in a negative direction in the one dimension when the piezoelectric device is deactivated.

14 Claims, 4 Drawing Sheets

METHOD AND APPARATUS FOR TRANSLATING A SPATIAL LIGHT MODULATOR TO PROVIDE DITHERING

FIELD OF THE INVENTION

This invention relates in general to a support providing freedom of movement in one dimension of a plane, and more particularly to a method of translating a spatial light modulator to provide dithering.

BACKGROUND OF THE INVENTION

This invention relates to a precision micro positioning device which allows micron linear translation of a spatial light modulator (Liquid Crystal Display (LCD)). At present, the commercial LCD technology market is aimed at producing images for output into front projector, Digital TV and HDTV, Rear Projection TV, PDP-TV, and LCD-TV applications. The requirements for these systems are not as demanding as those required for imaging still pictures onto digital AGX paper. Imaging still pictures onto digital AGX paper require a higher resolution than today's LCD's are capable of providing. Therefore, to achieve a resolution that is acceptable in producing high quality still images on digital AGX paper, dithering is required.

SUMMARY OF THE INVENTION

A micro positioning system which enables precision linear motion used in positioning of a liquid crystal display to enable greater resolution in imaging.

Briefly, according to one aspect of the present invention a method for translating a spatial light modulator to provide dithering comprises the steps of: providing a support have a high degree of flexibility; rigidly attaching an outer portion of the support to a nonmoving base; attaching an inner web of the support to the outer portion by means of flexible members; wherein the support, the outer portion, the inner web, and the flexible members are located in a first plane; wherein the flexible members allows motion of the inner web in only one dimension of the first plane; attaching a piezoelectric device to a first end of the inner web; energizing the piezoelectric device to move the inner web in a positive direction in the one dimension; attaching a spring to a second end of the inner web; and wherein the spring moves the inner web in a negative direction in the one dimension when the piezoelectric device is deactivated.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
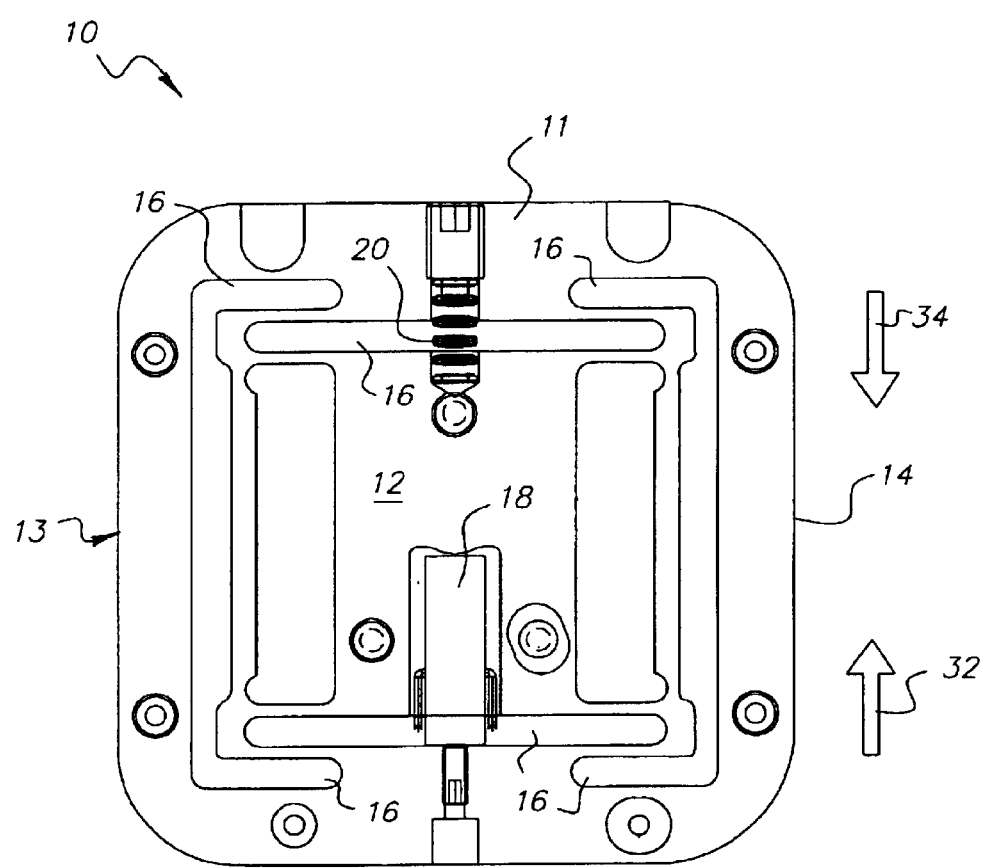
FIG. 1 illustrates a single axis dither apparatus with a piezo device.

Referring now to FIG. 1 an apparatus for translating a spatial light modulator to provide dithering is referred to in general by numeral 10. A first single axis dither apparatus 13 is comprised of a support 11. Support 11 is comprised of an inner web 12, an outer portion 14, and flexible members 16.

The support 11 has a high degree of flexibility. In the preferred embodiment the support is comprised of a fiber glass filled polycarbonate. Other materials having the required degree of flexibility include polypropylene, beryllium copper, and stainless steel. When using a fiber glass filled polycarbonate, the support should be approximately 12 mm thick, although thickness will depend on the material selected.

The support 11 is rigidly attached by an outer portion 14 to a nonmoving base, not shown, such as the frame of a printer. An inner web 12 of the support is connected to the outer portion 14 by flexible members 16. The flexible members 16 allow motion of the inner web in only one dimension of a first plane comprising flexible members, the support, outer portion, and the inner web.

A piezoelectric device 18 is attached to a first end of the inner web 12. Energizing the piezoelectric device 18 moves the inner web 12 in a positive direction in the plane, shown by arrow 32. Spring 20 is attached to a second end of the inner web 12. The spring moves the inner web in a negative direction in the plane, shown by arrow 34, when the piezoelectric device is deactivated.

Figure 2:
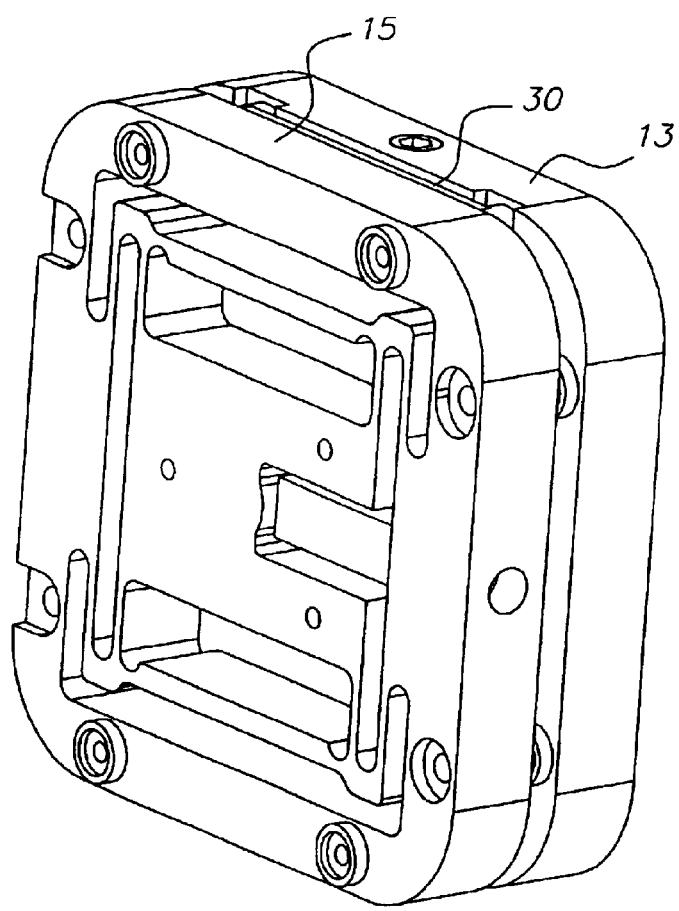
FIG. 2 illustrates a pair of single axis dither apparatus's mounted together by a spacer to achieve multiple axis dithering.

In a preferred embodiment of the invention shown in FIG. 2, two of the single axis dither apparatus 13 and 15 are mounted together, separated by a spacer 30, such that the single degree of motion of each of the single axis dither apparatus is oriented 90 degrees from the axis of the other. This allows dithering in a X-Y plane.

Figure 3:
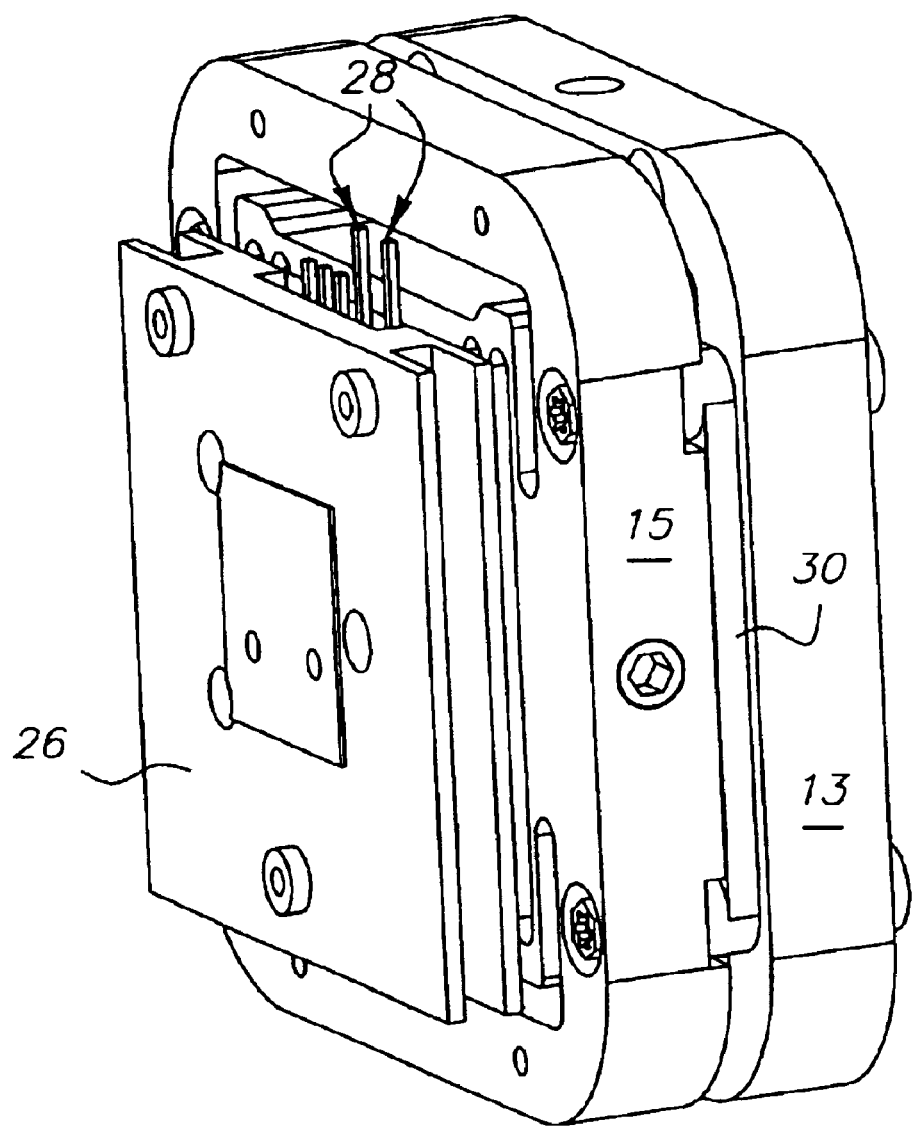
FIG. 3 illustrates a pair of single axis dither apparatus's mounted together by a spacer to achieve multiple axis dithering showing the mounting of the heat exchanger and resistive heaters.

FIG. 3 shows a heat exchanger 26 and resistive heaters 28 attached to the composite unit comprised of two single axis dither apparatus. The heat exchanger and resistive heaters are necessary to maintain a constant temperature for the spatial light modulator, in this case a Liquid Crystal Device (LCD).

Figure 4:
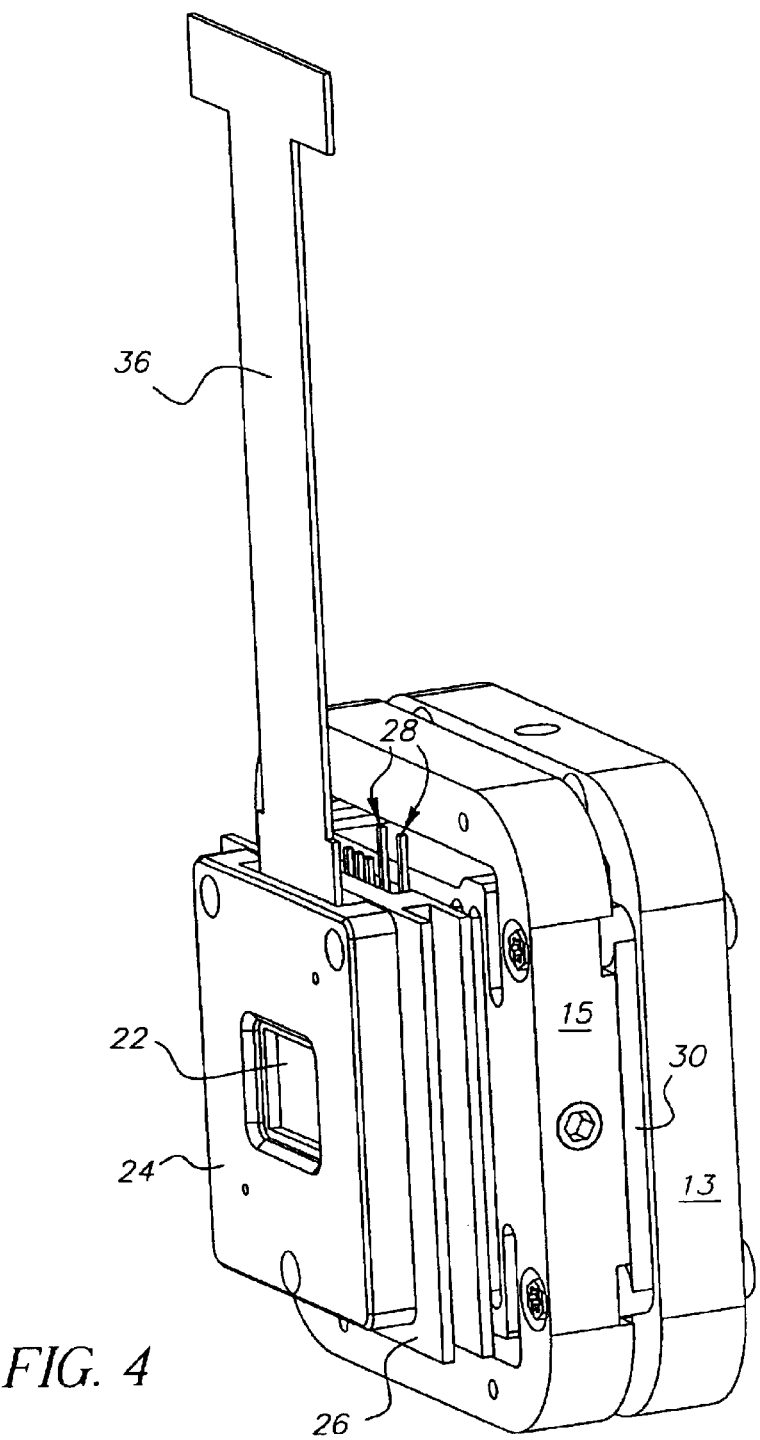
FIG. 4 illustrates a pair of single axis dither apparatus's mounted together by a spacer to achieve multiple axis dithering showing the mounting of the heat exchanger, resistive heaters, the spatial light modulator (LCD), and the spatial light modulator (LCD) mount.

FIG. 4 shows a spatial light modulator 22 attached to the inner web 12 in a plane approximately parallel to the plane formed by the single axis dithering apparatus 15. Note that all three components, the spatial light modulator 22, and the two single axis dither apparatus 13 and 15, are in planes which are approximately parallel to each other.

As shown in FIGS. 1 and 2 the flexible members 16 have a linear dimension, which is approximately perpendicular to the direction of movement shown by arrows 32 and 34. Thus, movement of the spatial light modulator, which is attached to single axis dither apparatus 15 is confined to one directional movement.

In operation, one of the two piezoelectric devices 18 is energized which forces the inner web to move forward flexing the flexible members 16. When the piezoelectric device 18 is de-energized, spring member 20 moves the inner web 12 and hence the spatial light modulator in a reverse direction returning it to a rest position. Utilizing both of the single axis dither apparatus it is seen that the spatial light modulator can be moved in both the X and Y directions by activating or deactivating one or both of the piezoelectric devices.

Overall construction of the device may be better appreciated by referring to FIG. 4. It is seen that first single axis dither apparatus 13 may be bolted to a frame, such as the frame of a printing machine (not shown). A spacer 30 separates the first single axis dithering apparatus 13 from the second single axis dithering apparatus 15. Heat exchanger 26 is mounted on second single axis dithering apparatus 15. Spatial light modulator 22 is mounted to spatial light modulator mount 24, which in turn is mounted to heat exchanger 26. A flexible cable 36 connects LCD modulator 22 to a circuit board, which is not shown.

The invention has been described in detail with particular reference to certain preferred embodiments thereof, but it will be understood that variations and modifications can be effected within the scope of the invention.

Parts List

10 Apparatus for translating a spatial light modulator
11 Support
12 Inner web
13 First single axis dither apparatus
14 Outer portion
15 Second single axis dither apparatus
16 Flexible members
18 Piezoelectric device
20 Spring
22 Spatial light modulator
24 Spatial light modulator mount
26 Heat Exchanger
28 Resistive Heaters
30 Spacer
32 Arrow
34 Arrow
36 Flexible cable

What is claimed is:

1. A method of translating a spatial light modulator to provide dithering comprising the steps of:
   providing a first support having a high degree of flexibility;
   rigidly attaching an outer portion of said first support to a nonmoving base;
   attaching an inner web of said first support to said outer portion by means of flexible members;
   wherein said first support, said outer portion, said inner web, and said flexible members are located in a first plane;
   wherein said flexible members allows motion of said inner web in only one dimension of said first plane;
   attaching a piezoelectric device to a first end said inner web;
   energizing said piezoelectric device to move said inner web in a positive direction in said one dimension;
   attaching a spring to a second end of said inner web; and
   wherein said spring moves said inner web in a negative direction in said one dimension when said piezoelectric device is deactivated.

2. A method of translating a spatial light modulator as in claim 1 wherein said spatial light modulator is attached to said inner web in a second plane approximately parallel to said first plane.

3. A method of translating a spatial light modulator as in claim 1 wherein said first support is selected from a group of materials comprised of fiberglass filled polycarbonate, polypropylene, beryllium cooper, and stainless steel.

4. A method of translating a spatial light modulator as in claim 1 wherein each of said flexible members has a thickness of 1–2 mm.

5. A method of translating a spatial light modulator as in claim 1 wherein said flexible members have a linear dimension, which is approximately perpendicular to said one dimension.

6. A method of translating a spatial light modulator as in claim 5 wherein said flexible members are arranged in pairs in four corners of said inner web.

7. A method of translating a spatial light modulator to provide dithering as in claim 1 comprising the additional steps of:
   providing a second support having a high degree of flexibility;
   rigidly attaching an outer portion of said second support to said first support;
   attaching an inner web of said second support to said outer portion by means of flexible members;
   wherein said second support, said outer portion, said inner web, and said flexible members are located in a third plane;
   wherein said flexible members allows motion of said inner web in only one dimension of said third plane; and
   wherein said one dimension of said third plane is perpendicular to said one dimension of said first plane.

8. An apparatus for translating a spatial light modulator to provide dithering comprising:
   a first support having a high degree of flexibility;
   an outer portion of said first support attached to a nonmoving base;
   an inner web of said first support attached to said outer portion by means of flexible members;
   wherein said first support, said outer portion, said inner web, and said flexible members are located in a first plane;
   wherein said flexible members allow motion of said inner web in only one dimension of said first plane;
   a first piezoelectric device attached to a first end said inner web;
   wherein said second piezoelectric device moves said inner web in a positive direction in said one dimension;
   a first spring attached to a second end of said inner web; and
   wherein said second spring moves said inner web in a negative direction in said one dimension when said second piezoelectric device is deactivated.

9. An apparatus for translating a spatial light modulator as in claim 8 wherein said spatial light modulator is attached to said inner web in a second plane approximately parallel to said first plane.

10. An apparatus for translating a spatial light modulator as in claim 8 wherein said support is selected from a group of materials comprised of fiberglass filled polycarbonate, polypropylene, beryllium copper, and stainless steel.

11. An apparatus for translating a spatial light modulator as in claim 10 wherein each of said flexible members has a thickness of 1–2 mm.

12. An apparatus for translating a spatial light modulator as in claim 8 wherein said flexible members have a linear dimension, which is approximately perpendicular to, said one dimension.

13. An apparatus for translating a spatial light modulator as in claim 12 wherein said flexible members are arranged in pairs at four corners of said inner web.

14. An apparatus for translating a spatial light modulator to provide dithering as in claim 8 wherein:

- a second support having a high degree of flexibility;
- an outer portion of said second support attached to a nonmoving base;
- an inner web of said second support attached to said outer portion by means of flexible members;
- wherein said second support, said outer portion, said inner web, and said flexible members are located in a third plane;
- wherein said flexible members allow motion of said inner web in only one dimension of said third plane and said one dimension of said third plane is perpendicular to said one dimension of said first plane;
- a second piezoelectric device attached to a first end said inner web;
- wherein said second piezoelectric device moves said inner web in a positive direction in said one dimension;
- a second spring attached to a second end of said inner web; and
- wherein said second spring moves said inner web in a negative direction in said one dimension when said second piezoelectric device is deactivated.

* * * * *